United States Patent
Lee

(10) Patent No.: US 11,915,388 B2
(45) Date of Patent: Feb. 27, 2024

(54) AFTERIMAGE DETECTION DEVICE THAT REPEATS DOWNSCALING OF AN INPUTIMAGE USING AT LEAST ONE OF DOWNSCALING WEIGHT AND LUMINANCE WEIGHT BASED ON A TIME PARAMETER AND DISPLAY DEVICE INCLUDING THE SAME

(71) Applicant: Samsung Display Co., LTD., Yongin-si (KR)

(72) Inventor: Jun Gyu Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 4 days.

(21) Appl. No.: 17/476,008

(22) Filed: Sep. 15, 2021

(65) Prior Publication Data

US 2022/0188977 A1    Jun. 16, 2022

(30) Foreign Application Priority Data

Dec. 14, 2020   (KR) .......................... 10-2020-0174381

(51) Int. Cl.
*G06T 3/40*    (2006.01)
(52) U.S. Cl.
CPC .............. *G06T 3/4084* (2013.01); *G06T 3/40* (2013.01)
(58) Field of Classification Search
None
See application file for complete search history.

(56) References Cited

U.S. PATENT DOCUMENTS 8,004,543 B2 *   8/2011   Heo .................... H04N 7/0122
                                                      345/660
10,984,759 B2 *  4/2021   Chun .................... G09G 3/007
(Continued)

FOREIGN PATENT DOCUMENTS

KR    10-2007-0075943     7/2007
KR    10-0779312          11/2007
(Continued)

OTHER PUBLICATIONS

STIC Provided English Translation of WO2021/085679 A1 (Year: 2019).*
(Continued)

*Primary Examiner* — Tyler W. Sullivan
(74) *Attorney, Agent, or Firm* — KILE PARK REED & HOUTTEMAN PLLC

(57) ABSTRACT

An afterimage detection device includes a downscaling unit, an image accumulation unit, an afterimage detection unit and a weight applying unit. The downscaling unit downscales at least one input image at a preset ratio. The image accumulation unit receives at least one downscale image from the downscaling unit and accumulates the at least one downscale image. The afterimage detection unit detects an afterimage from an accumulated downscale image obtained by the image accumulation unit and generates afterimage information. The weight applying unit receives the afterimage information, calculates a downscaling weight of a region of interest including the afterimage in the input image based on a time parameter, and provides the downscaling weight to the downscaling unit. The weight applying unit may also or instead calculate and provide a luminance weight based on the time parameter.

22 Claims, 11 Drawing Sheets

(56) References Cited

U.S. PATENT DOCUMENTS

| | | | | |
|---|---|---|---|---|
| 2006/0171360 A1* | 8/2006 | Kim | ........................ | H04M 1/22 |
| | | | | 370/335 |
| 2007/0132788 A1* | 6/2007 | Heo | ........................ | G09G 5/02 |
| | | | | 348/E5.111 |
| 2020/0074900 A1* | 3/2020 | Zhang | .................... | G09G 3/003 |
| 2020/0090628 A1* | 3/2020 | Park | ........................ | G09F 9/301 |
| 2020/0372860 A1* | 11/2020 | Kim | ........................ | H04N 5/57 |
| 2022/0366853 A1* | 11/2022 | Kwon | ................... | G09G 3/3258 |

FOREIGN PATENT DOCUMENTS

| | | |
|---|---|---|
| KR | 10-2009-0071683 | 7/2009 |
| KR | 10-2015-0029174 | 3/2015 |
| KR | 10-2020-0044171 | 4/2020 |
| WO | WO-2021085679 A1 * | 5/2021 |

OTHER PUBLICATIONS

Joseph Redmon et al., "YOLOv3: An Incremental Improvement", Apr. 8, 2018, pp. 1-6.

* cited by examiner

AFTERIMAGE DETECTION DEVICE THAT REPEATS DOWNSCALING OF AN INPUTIMAGE USING AT LEAST ONE OF DOWNSCALING WEIGHT AND LUMINANCE WEIGHT BASED ON A TIME PARAMETER AND DISPLAY DEVICE INCLUDING THE SAME

CROSS-REFERENCE TO RELATED APPLICATION(S)

This application claims priority to and benefits of Korean Patent Application No. 10-2020-0174381 under 35 U.S.C. § 119, filed on Dec. 14, 2020, in the Korean Intellectual Property Office, the entire contents of which are incorporated herein by reference.

BACKGROUND

1. Technical Field

The disclosure relates to an afterimage detection device and a display device including the same.

2. Description of the Related Art

An afterimage may occur in case that a display device displays an image having a fixed image for a considerably long period of time. In case that the display device displays an image having a fixed image for a considerably long period of time and then displays an image having no fixed image, the area where the fixed image was displayed may display a stain. Therefore, in case that an afterimage occurs on the display device, a display quality may deteriorate.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide an afterimage detection device capable of improving an afterimage detection rate, and a display device capable of preventing occurrence of an afterimage, reducing a color shift, and improving a display quality.

However, aspects of the disclosure are not restricted to the ones set forth herein. The above and other aspects of the disclosure will become more apparent to one of ordinary skill in the art to which the disclosure pertains by referencing the detailed description of the disclosure given below.

According to an embodiment, an afterimage detection device may include a downscaling unit that downscales an input image at a preset ratio; an image accumulation unit that receives at least one downscale image from the downscaling unit and accumulates the at least one downscale image; an afterimage detection unit that detects an afterimage from an accumulated downscale image obtained by the image accumulation unit and generates afterimage information; and a weight applying unit that receives the afterimage information, calculates a downscaling weight of a region of interest including the afterimage in the input image based on a time parameter, and provides the downscaling weight to the downscaling unit.

The time parameter may be a span of time during which an image including a fixed image is continuously displayed.

The downscaling unit may downscale the region of interest at a ratio to which the downscaling weight is applied, and may downscale a general region except the region of interest in the input image at the preset ratio.

A size of the region of interest downscaled at the ratio to which the downscaling weight is applied may be larger than a size of the region of interest downscaled at the preset ratio.

A size of the region of interest downscaled at the ratio to which the downscaling weight is applied at a first time parameter may be larger than a size of the region of interest downscaled at the ratio to which the downscaling weight is applied at a second time parameter, the first time parameter being greater than the second time parameter.

The weight applying unit may recalculate the downscaling weight based on the time parameter when a proportion of the region of interest in the accumulated downscale image does not reach a preset proportion.

The weight applying unit may output afterimage data including an afterimage detection result when a proportion of the region of interest in the accumulated downscale image reaches a preset proportion.

The weight applying unit may additionally calculate a luminance weight of a general region except the region of interest in the input image based on the time parameter, and may provide the luminance weight to the downscaling unit.

The downscaling unit may downscale the region of interest at a ratio to which the downscaling weight is applied, may downscale the general region at a preset ratio, and may reduce a luminance of the general region based on the luminance weight.

A size of the region of interest downscaled at the ratio to which the downscaling weight is applied may be larger than a size of the region of interest downscaled at the preset ratio, and a luminance of the general region to which the luminance weight is applied may be lower than a luminance of the general region in the input image.

A luminance of the general region to which the luminance weight is applied at a first time parameter may be lower than a luminance of the general region to which the luminance weight is applied at a second time parameter, the first time parameter being greater than the second time parameter.

The weight applying unit may recalculate the downscaling weight and the luminance weight based on the time parameter when a proportion of the region of interest in the accumulated downscale image does not reach a preset proportion.

The weight applying unit may output afterimage data including an afterimage detection result when a proportion of the region of interest in the accumulated downscale image reaches a preset proportion.

According to an embodiment, an afterimage detection device may include a downscaling unit that downscales an input image at a preset ratio; an image accumulation unit that receives at least one downscale image from the downscaling unit and accumulates the at least one downscale image; an afterimage detection unit that detects an afterimage from an accumulated downscale image obtained by the image accumulation unit and generates afterimage information; and a weight applying unit that receives the afterimage information, calculates a luminance weight of a general region which does not include the afterimage in the input image based on a time parameter, and provides the luminance weight to the downscaling unit.

The time parameter may be a span of time during which an image including a fixed image is continuously displayed.

The downscaling unit may downscale the input image at a preset ratio and may reduce a luminance of the general region based on the luminance weight.

A luminance of the general region to which the luminance weight is applied at a first time parameter may be lower than a luminance of the general region to which the luminance weight is applied at a second time parameter, the first time parameter being greater than the second time parameter.

The weight applying unit may recalculate the luminance weight based on the time parameter when a luminance of the general region in the accumulated downscale image is equal to or greater than a preset luminance.

The weight applying unit may output afterimage data including an afterimage detection result when a luminance of the general region in the accumulated downscale image is lower than a preset luminance.

According to an embodiment, a display device may include an afterimage detection device that detects an afterimage of an input image and output afterimage data; a timing controller that generates compensation data based on the afterimage data; and a display panel that displays an image based on the compensation data. The afterimage detection device comprises a downscaling unit that downscales an input image at a preset ratio; an image accumulation unit that receives at least one downscale image from the downscaling unit and accumulates the at least one downscale image; an afterimage detection unit that detects an afterimage from an accumulated downscale image obtained by the image accumulation unit and generates afterimage information; and a weight applying unit that receives the afterimage information, calculates a downscaling weight of a region of interest including the afterimage in the input image based on a time parameter, and provides the downscaling weight to the downscaling unit.

In accordance with the afterimage detection device and the display device including the same according to embodiments, it is possible to improve the afterimage detection rate by repeating the process of downscaling an input image using at least one of a downscaling weight or a luminance weight calculated based on a time parameter. Therefore, the afterimage detection device and the display device including the same may prevent the occurrence of an afterimage, reduce the color shift, and improve the display quality.

It should be noted that the effects of the disclosure are not limited to those described above, and other effects of the disclosure will be apparent from the following description.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
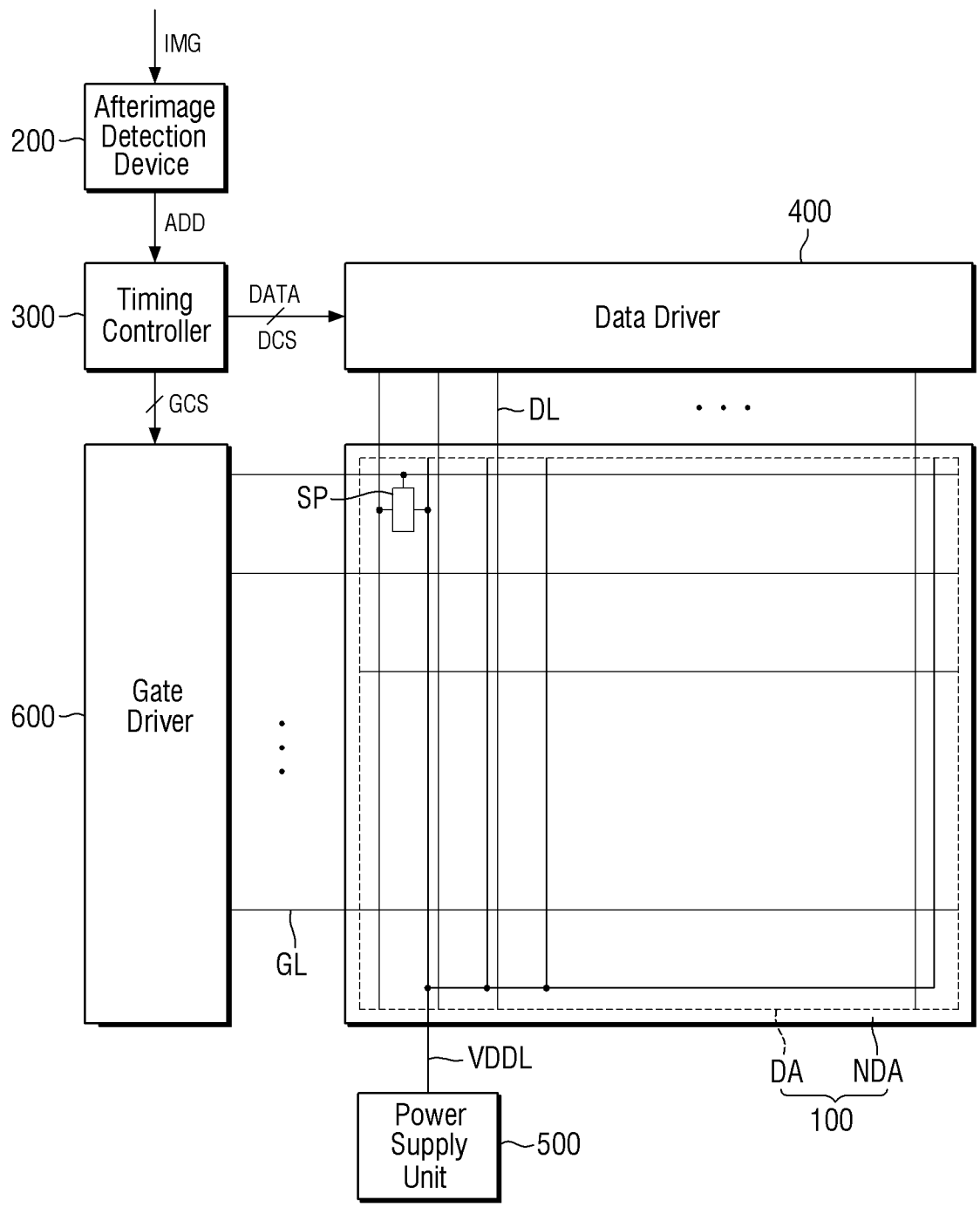
FIG. 1 is a block diagram illustrating a display device according to an embodiment.

In the following description, for the purposes of explanation, numerous details are set forth in order to provide a thorough understanding of various embodiments or implementations of the disclosure. As used herein "embodiments" and "implementations" are interchangeable words that are non-limiting examples of devices or methods employing one or more of the implementations or embodiments disclosed herein. It is apparent, however, that various embodiments may be practiced without these details or with one or more equivalent arrangements. In other instances, structures and devices may be shown in block diagram form in order to avoid unnecessarily obscuring various embodiments. Further, various embodiments may be different, but do not have to be exclusive. For example, shapes, configurations, and characteristics of an embodiment may be used or implemented in another embodiment without departing from the scope of the disclosure.

Unless otherwise specified, the illustrated embodiments are to be understood as providing features of varying detail of some or a number of ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be substantially perpendicular to one another, or may represent different directions that may not be perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, by way of non-limiting example, for instance, XYZ, XYY, YZ, and ZZ. As used herein, the term "and/or" includes any and all combinations of one or more of the associated listed items. For example, "A and/or B" may be understood to mean "A, B, or A and B."

The terms "and" and "or" may be used in the conjunctive or disjunctive sense and may be understood to be equivalent to "and/or."

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (for example, as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (for example, rotated 90 degrees or about 90 degrees or at other orientations), and, as such, the spatially relative descriptors used herein interpreted accordingly.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terminology used herein is for the purpose of describing embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," "has," and/or "having," and/or variations thereof when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

For example, "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Some or a number of embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (for example, microcode) to perform various functions discussed herein and may optionally be driven by firmware and/or software. It is also contemplated that each block, unit, and/or module may be implemented by dedicated hardware, or as a combination of dedicated hardware to perform some or a number of functions and a processor (for example, one or more programmed microprocessors and associated circuitry) to perform other functions. Also, each block, unit, and/or module of some or a number of embodiments may be physically separated into two or more interacting and discrete blocks, units, and/or modules without departing from the scope of the disclosure. Further, the blocks, units, and/or modules of some or a number of embodiments may be physically combined into more complex blocks, units, and/or modules without departing from the scope of the disclosure.

Unless otherwise defined, all terms (including technical and scientific terms) used herein have the same meaning as commonly understood by one of ordinary skill in the art to which this disclosure pertains. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram illustrating a display device according to an embodiment.

Referring to FIG. 1, a display device, as a device for displaying a moving or still image, may be employed as a display screen of various products such as a television, a laptop computer, a monitor, a billboard, and an Internet of Things (IoT) device as well as portable electronic devices such as a mobile phone, a smartphone, a tablet personal computer (PC), a smart watch, a watch phone, a mobile communication terminal, an electronic notebook, an eBook reader, a portable multimedia player (PMP), a navigation device, and an ultra-mobile PC (UMPC), by way of non-limiting example.

The display device may include a display panel 100, an afterimage detection device 200, a timing controller 300, a data driver 400, a power supply unit 500, and a gate driver 600.

The display panel 100 may have a substantially rectangular shape in a plan view. For example, the display panel 100 may have a substantially rectangular shape, in a plan view, having long sides in a first direction and short sides in a second direction perpendicular to the first direction. A corner formed by the long side in the first direction and the short side in the second direction may be substantially right-angled or substantially rounded with a predetermined curvature. The substantially planar shape of the display panel 100 is not limited to the substantially rectangular shape, and may be formed in another polygonal shape, a substantially circular shape or a substantially elliptical shape. For example, the display panel 100 may be formed to be flat or substantially flat, but is not limited thereto. In another example, the display panel 100 may be bent with a predetermined curvature.

The display panel 100 may include a display area DA and a non-display area NDA.

The display area DA, which is an area for displaying an image, may be defined as the central area of the display panel 100. The display area DA may include pixels SP formed or disposed in pixel areas defined by data lines DL and gate lines GL intersecting each other. Each of the pixels SP may be electrically connected to at least one gate line GL, a data line DL, and a driving voltage line VDDL. Each of the pixels SP may be defined as an area of the smallest unit that outputs light.

Data lines DL may be electrically connected between the data driver 400 and the pixels SP. The data lines DL may supply a data voltage to each of the pixels SP. The data lines DL may be spaced apart from each other in the first direction and extend in the second direction.

Gate lines GL may be electrically connected between the gate driver 600 and the pixels SP. The gate lines GL may supply a gate signal to each of the pixels SP. The gate lines GL may extend in the first direction and be spaced apart from each other in the second direction.

The non-display area NDA may be defined as the remaining area of the display panel 100 except the display area DA. For example, the non-display area NDA may include the gate driver 600 for applying gate signals to the gate lines GL, fan-out lines that electrically connect the data lines DL to the data driver 400, and a pad portion electrically connected to a ductile film.

The afterimage detection device 200 may receive an input image IMG and generate afterimage data ADD including afterimage information of the input image IMG. For example, the afterimage detection device 200 may receive gradation data of the input image IMG on a frame basis and detect the afterimage of the input image IMG using at least one of a convolutional neural network technology, a deep learning technology, or an artificial intelligence technology. The afterimage information of the input image IMG may be generated in case that the input image IMG has a fixed image for a considerably long period of time. The afterimage detection device 200 may provide the afterimage data ADD including the afterimage information to the timing controller 300.

The timing controller 300 may receive a timing synchronization signal from a display driving system (not shown) and receive the afterimage data ADD from the afterimage detection device 200. The timing controller 300 may generate a data control signal DCS and a gate control signal GCS based on the timing synchronization signal. The timing controller 300 may control the driving timing of the data driver 400 using the data control signal DCS and control the driving timing of the gate driver 600 using the gate control signal GCS.

The timing controller 300 may generate compensation data DATA based on the afterimage data ADD and provide the compensation data DATA aligned to be suitable for the arrangement structure of the pixels SP to the data driver 400. The timing controller 300 supplies the compensation data DATA that has reflected the afterimage data ADD to the data driver 400, so that the display device may prevent an occurrence of an afterimage and improve a display quality.

The data driver 400 may receive the compensation data DATA and the data control signal DCS from the timing controller 300. The data driver 400 may generate a data voltage based on the compensation data DATA and supply the data voltage to the data line DL based on the data control signal DCS. The data voltage may be supplied to the pixels SP through the data line DL to determine the luminance of the pixels SP.

The power supply unit 500 may supply a driving voltage to the display panel 100. The power supply unit 500 may generate the driving voltage and supply the driving voltage to the pixels SP arranged or disposed on the display panel 100 through the driving voltage line VDDL. The power supply unit 500 may generate a common voltage and supply the common voltage to a low potential line of the display panel 100. For example, the driving voltage may correspond to a high potential voltage capable of driving the pixels SP, and the common voltage may correspond to a low potential voltage commonly supplied to the pixels SP.

The gate driver 600 may be disposed in the non-display area NDA of the display panel 100. The gate driver 600 may generate gate signals based on the gate control signal GCS supplied from the timing controller 300 and sequentially supply the gate signals to the gates lines GL in a preset order.

Figure 2:
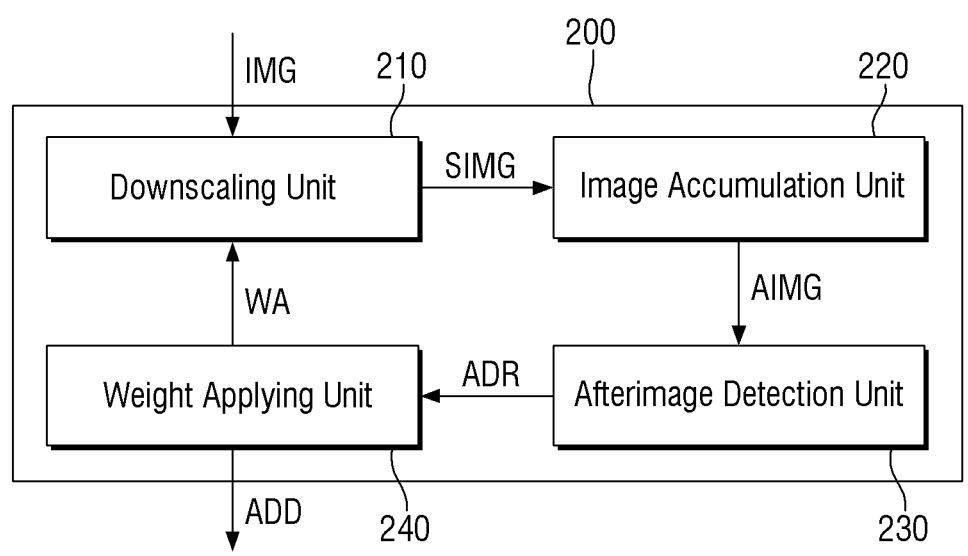
FIG. 2 is a block diagram showing an afterimage detection device of a display device according to an embodiment.

FIG. 2 is a block diagram showing an afterimage detection device of a display device according to an embodiment.

Referring to FIG. 2, the afterimage detection device 200 may include a downscaling unit 210, an image accumulation unit 220, an afterimage detection unit 230, and a weight applying unit 240.

The downscaling unit 210 may receive the input image IMG on a frame basis and downscale the input image IMG at a preset ratio. The downscaling unit 210 may downscale the input image IMG by generating gradation data having a reduced pixel size based on the gradation data of the input image IMG having a predetermined pixel size. The input image IMG may include a region of interest including an afterimage and a general region except the region of interest. The downscaling ratio of the region of interest may be changed by a downscaling weight, but the downscaling ratio of the general region may be fixed to the preset ratio. For example, in case that additional weigh information WA is not received, the downscaling unit 210 may downscale the horizontal size and the vertical size of each of the general region and the region of interest of the input image IMG by 1/n times. In case that the downscaling unit 210 receives the downscaling weight, the downscaling unit 210 may downscale the horizontal size and the vertical size of the general region by 1/n times, and downscale the horizontal size and the vertical size of the region of interest at the ratio to which the downscaling weight is applied. The downscaling unit 210 may provide a downscale image SIMG to the image accumulation unit 220. The afterimage detection device 200 may improve an afterimage detection rate by applying the downscaling weight to the region of interest.

The image accumulation unit 220 may receive at least one downscale image SIMG and accumulate at least one downscale image SIMG. For example, the image accumulation unit 220 may accumulate downscale images SIMG corresponding to frames, but the disclosure is not limited thereto. The image accumulation unit 220 may generate the gradation data of an accumulated downscale image AIMG by merging the gradation data of the downscale image SIMG having the reduced pixel size. The image accumulation unit 220 may accumulate the downscale image SIMG corresponding to at least one frame and provide the accumulated downscale image AIMG to the afterimage detection unit 230. Since the image accumulation unit 220 accumulates the downscale images SIMG, it is possible to reduce the amount of calculation of the afterimage detection unit 230 and the afterimage detection device 200, minimize a memory, and reduce the calculation load of the afterimage detection unit 230 and the afterimage detection device 200.

The afterimage detection unit 230 may detect an afterimage from the accumulated downscale image AIMG obtained by the image accumulation unit 220 and generate afterimage information. For example, the afterimage detection unit 230 may detect the afterimage from the accumulated downscale image AIMG using at least one of the convolutional neural network technology, the deep learning technology, or the artificial intelligence technology, and generate afterimage information ADR. The afterimage information ADR may be generated in case that the input image IMG has a fixed image for a considerably long period of time.

The weight applying unit 240 may receive the afterimage information ADR and calculate the downscaling weight or the luminance weight of the region of interest including the afterimage in the input image IMG based on a time parameter. Here, the time parameter may correspond to a period of time, or an interval of time, or a span of time during which the image having the fixed image is continuously displayed. For example, as the time parameter increases, the probability of occurrence of an afterimage and the degree of the afterimage may increase. The weight applying unit 240 may provide the weight information WA including at least one of the downscaling weight or the luminance weight to the downscaling unit 210. The time parameter may include a first time parameter and a second time parameter. The first time parameter may be greater than the second time parameter.

The weight applying unit 240 may determine the proportion of the region of interest in the accumulated downscale image AIMG. In case that the proportion of the region of interest in the accumulated downscale image AIMG has not reached a preset proportion, the weight applying unit 240 may recalculate the downscaling weight based on the time parameter. The weight applying unit 240 may provide the weight information WA including the recalculated downscaling weight to the downscaling unit 210. In case that the downscaling unit 210 receives the weight information WA, the downscaling unit 210, the image accumulation unit 220, the afterimage detection unit 230, and the weight applying unit 240 may repeat the above-described processes.

In case that the proportion of the region of interest in the accumulated downscale image AIMG has reached the preset proportion, the weight applying unit 240 may provide the afterimage data ADD including the afterimage detection result to the timing controller 300. The timing controller 300 may generate the compensation data DATA based on the afterimage data ADD, and the data driver 400 may generate a data voltage based on the compensation data DATA. The timing controller 300 may supply the compensation data DATA that has reflected the afterimage data ADD to the data driver 400, so that the display device may prevent an occurrence of an afterimage, reduce a color shift, and improve a display device.

Figure 3:
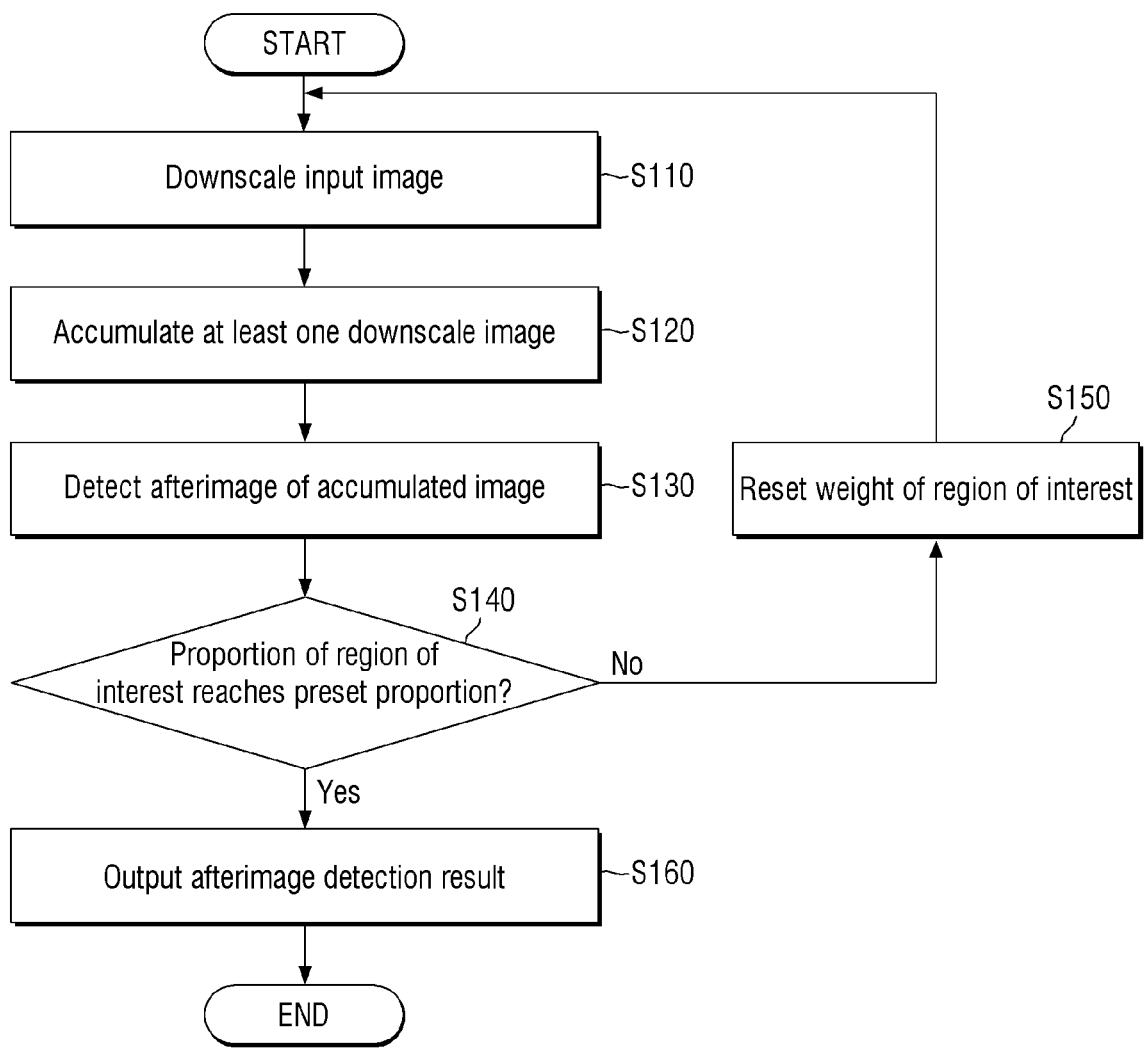
FIG. 3 is a flowchart showing an afterimage detection process of an afterimage detection device according to an embodiment.

FIG. 3 is a flowchart showing an afterimage detection process of an afterimage detection device according to an embodiment.

Referring to FIG. 3, the afterimage detection device 200 may include the downscaling unit 210, the image accumulation unit 220, the afterimage detection unit 230, and the weight applying unit 240.

The downscaling unit 210 may receive the input image IMG on a frame basis and downscale the input image IMG at the preset ratio (step S110). In case that additional weight information WA is not received, the downscaling unit 210 may downscale the horizontal size and the vertical size of each of the general region and the region of interest of the input image IMG by 1/n times.

The image accumulation unit 220 may receive at least one downscale image SIMG and accumulate at least one downscale image SIMG (step S120).

The afterimage detection unit 230 may detect the afterimage from the accumulated downscale image AIMG obtained by the image accumulation unit 220 and generate afterimage information (step S130).

The weight applying unit 240 may determine the proportion of the region of interest in the accumulated downscale image AIMG (step S140).

In step S150, the weight applying unit 240 may reset the downscaling weight or the luminance weight based on the time parameter in case that the proportion of the region of interest in the accumulated downscale image AIMG has not reached the preset proportion (i.e., step S140 is 'No'). The weight applying unit 240 may provide the weight information WA including at least one of the reset downscaling weight or the reset luminance weight to the downscaling unit 210.

In case that the downscaling unit 210 receives the weight information WA, the downscaling unit 210, the image accumulation unit 220, the afterimage detection unit 230, and the weight applying unit 240 may repeat the step S110, the step S120, the step S130, and the step S140. In case that the downscaling unit 210 receives the downscaling weight, the downscaling unit 210 may downscale the horizontal size and the vertical size of the general region by 1/n times, and downscale the horizontal size and the vertical size of the region of interest at the ratio to which the downscaling weight is applied.

In case that the proportion of the region of interest in the accumulated downscale image AIMG has reached the preset proportion (i.e., step S140 is 'Yes'), the weight applying unit 240 may provide the afterimage data ADD including the afterimage detection result to the timing controller 300 (step S160).

Figure 4:
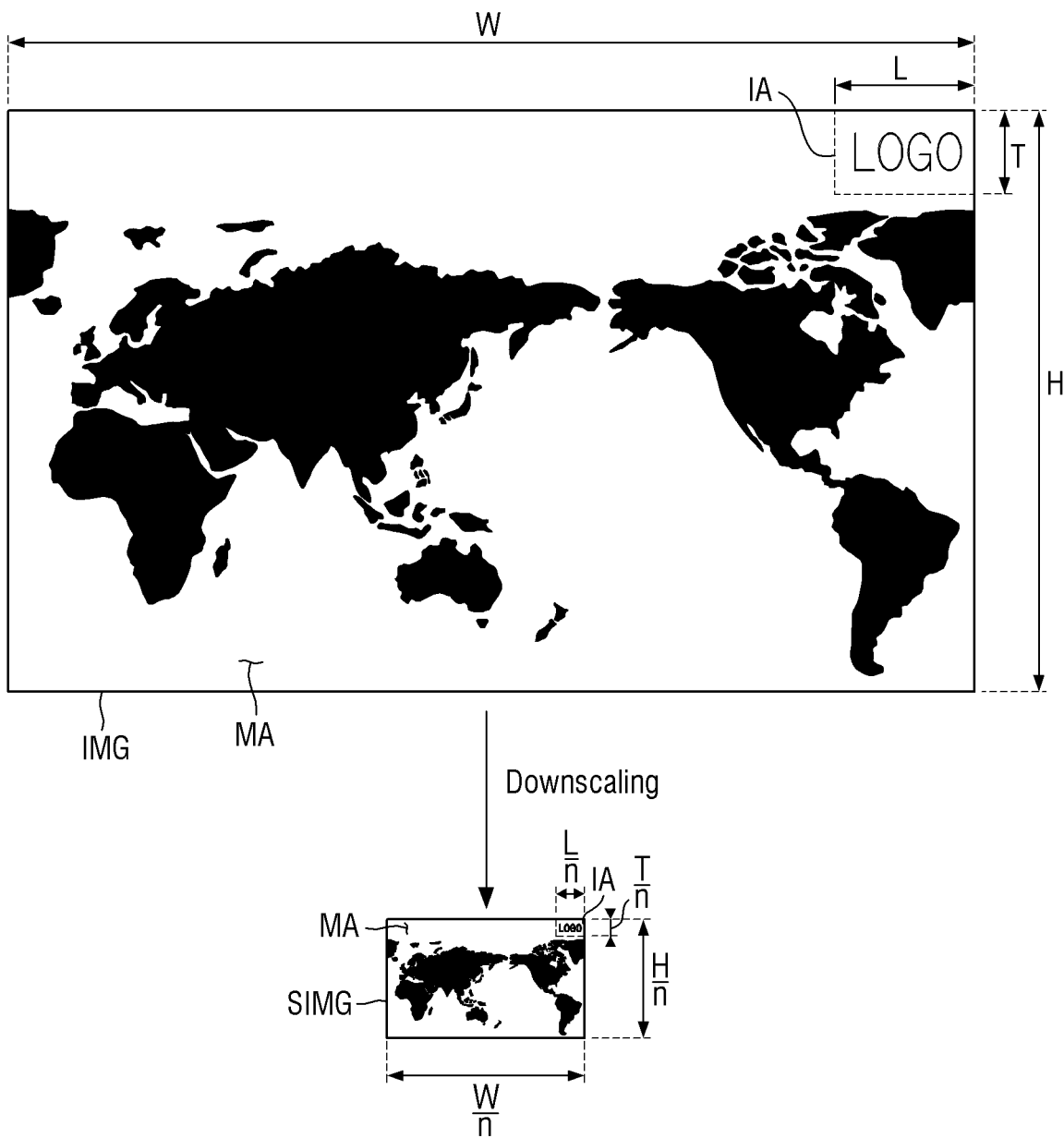
FIG. 4 shows a downscaling process of an afterimage detection device according to an embodiment.

FIG. 4 shows a downscaling process of an afterimage detection device according to an embodiment. FIG. 4 corresponds to a case where the downscaling unit does not receive additional weight information at the beginning of the downscaling process.

Referring to FIG. 4, the input image IMG may include a region of interest IA including a fixed image or an afterimage generated from the fixed image and a general region MA except the region of interest IA. For example, the region of interest IA may be located or disposed at a corner of the input image IMG, but the location and the number of the region of interest IA are not limited to those illustrated in FIG. 4.

The downscaling unit 210 may receive the input image IMG on a frame basis and downscale the input image IMG at the preset ratio. For example, in case that the additional weight information WA is not received, the downscaling unit 210 may downscale a horizontal size W and a vertical size H of the general region MA of the input image IMG by 1/n times and downscale a horizontal size L and a vertical size T of the region of interest IA by 1/n times. The downscaling unit 210 may downscale the input image IMG by generating gradation data having a reduced pixel size (W/n×H/n) based on the gradation data of the input image IMG having a predetermined pixel size (W×H).

Figure 5:
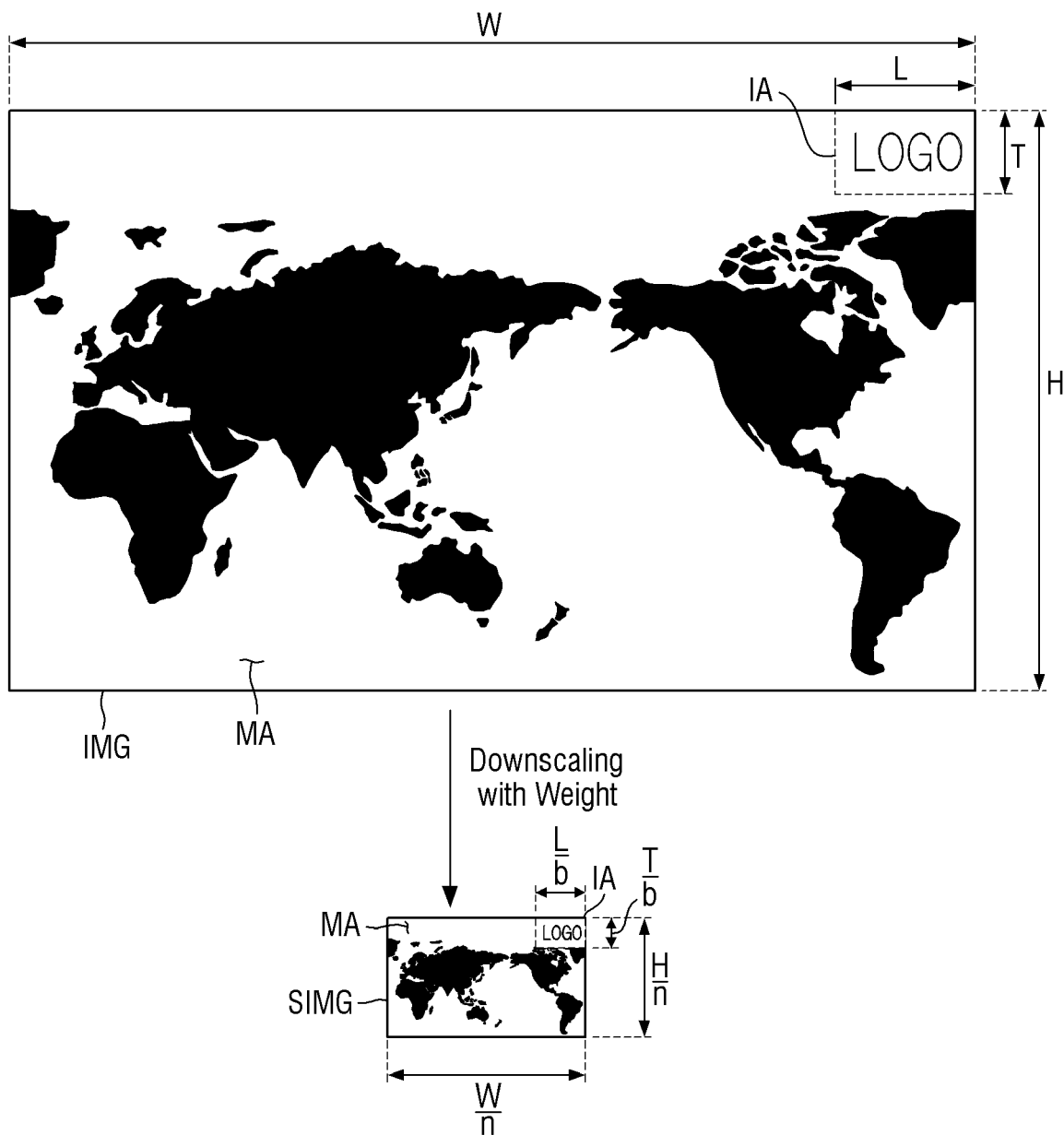
FIGS. 5 and 6 show the downscaling process to which the downscaling weight of an afterimage detection device according to an embodiment is applied.
Figure 6:
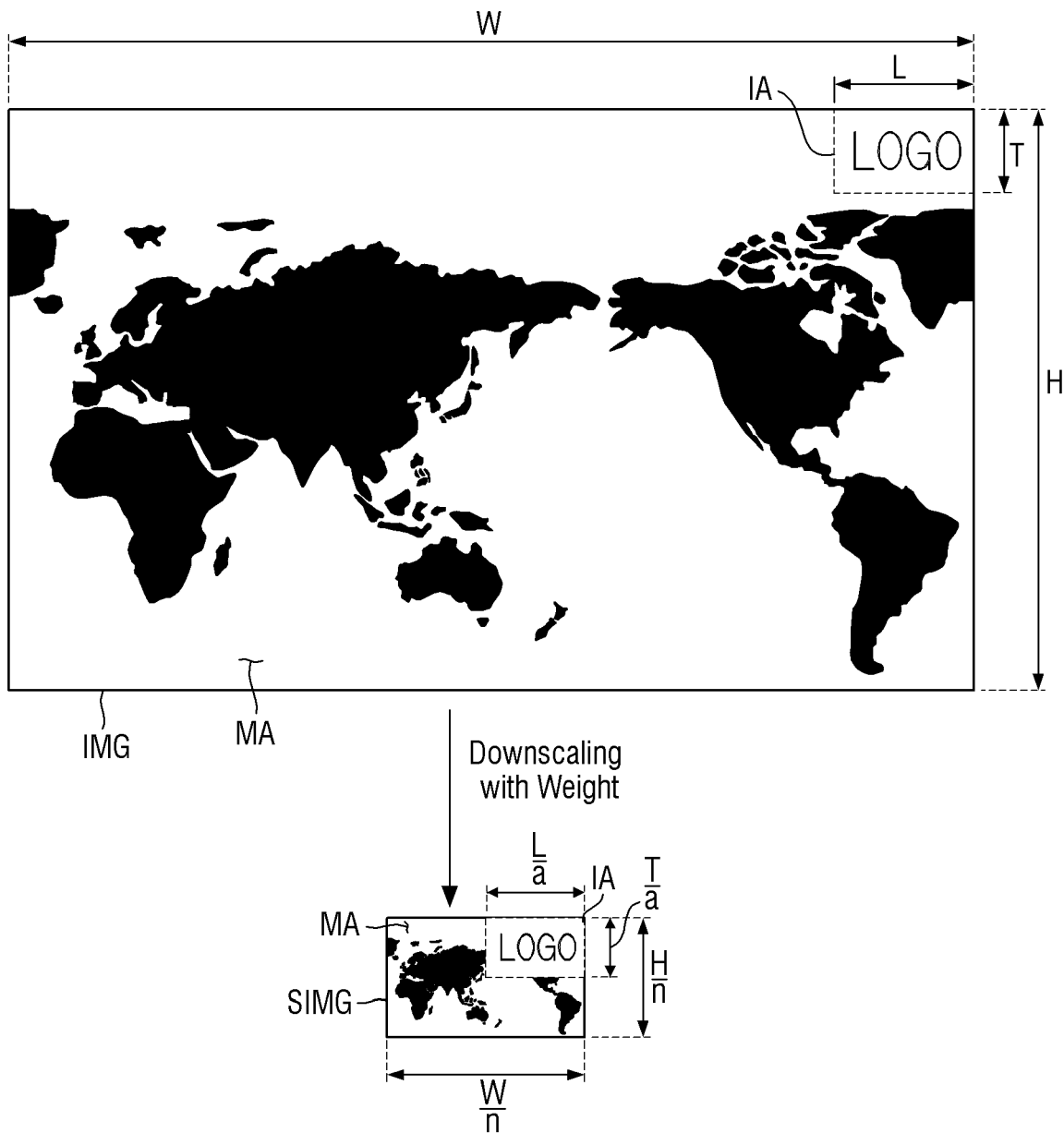

FIGS. 5 and 6 show the downscaling process to which the downscaling weight of an afterimage detection device according to an embodiment is applied. FIG. 5 corresponds to a case where the downscaling unit receives the downscaling weight after the downscaling process of FIG. 4, and FIG. 6 corresponds to a case where the downscaling unit receives the reset downscaling weight after the downscaling process of FIG. 5.

In FIG. 5, the weight applying unit 240 may receive the afterimage information ADR and calculate the downscaling weight of the region of interest IA based on the time parameter. The weight applying unit 240 may provide the weight information WA including the downscaling weight to the downscaling unit 210.

In case that the downscaling unit 210 receives the downscaling weight, the downscaling unit 210 may downscale the region of interest IA at the ratio to which the downscaling weight is applied (downscaling with weight) and downscale the general region MA at a preset ratio. For example, the downscaling unit 210 may downscale the horizontal size L and vertical size T of the region of interest IA by 1/b times and downscale the horizontal size W and vertical size H of the general region MA by 1/n times. The size (L/b×T/b) of the region of interest IA in FIG. 5 that is downscaled at the ratio to which the downscaling weight is applied may be greater than the size (L/n×T/n) of the region of interest IA in FIG. 4 that is downscaled at the preset ratio.

Therefore, the downscaling unit 210 may generate the downscale image SIMG in which the proportion of the region of interest IA is increased based on the downscaling weight. The afterimage detection device 200 may improve the afterimage detection rate using the downscale image SIMG in which the proportion of the region of interest IA is increased.

Referring to FIG. 6 as well as FIG. 3, the weight applying unit 240 may reset the downscaling weight based on the time parameter in case that the proportion of the region of interest IA in the accumulated downscale image AIMG has not reached the preset proportion. Here, since the accumulated downscale image AIMG is obtained by accumulating at least one downscale image SIMG, the proportion of the region of interest IA in the accumulated downscale image AIMG and the proportion of the region of interest IA in the downscale image SIMG may be the same. Further, in case that the downscaling unit 210, the image accumulation unit 220, the afterimage detection unit 230, and the weight applying unit 240 repeat the afterimage detection process, the time parameter may be continuously increased. The time parameter of the weight applied in FIG. 6 may be greater than the time parameter of the weight applied in FIG. 5.

In case that the downscaling unit 210 receives the reset downscaling weight, the downscaling unit 210 may downscale the region of interest IA at the ratio to which the downscaling weight is applied (downscaling with weight) and downscale the general region MA at the preset ratio. For example, the downscaling unit 210 may downscale the horizontal size L and the vertical size T of the region of interest IA by 1/a times and downscale the horizontal size W and vertical size H of the general region MA by 1/n times. The size (L/a×T/a) of the region of interest IA in FIG. 6 that is downscaled at the ratio to which the reset downscaling weight is applied may be greater than the size (L/b×T/b) of the region of interest IA in FIG. 5 that is downscaled at the ratio to which the previous downscaling weight is applied. The size (L/a×T/a) of the region of interest IA in FIG. 6 that is downscaled at the ratio to which the reset downscaling weight is applied may be greater than the size (L/n×T/n) of the region of interest IA that is downscaled at the preset ratio.

In case that the proportion of the region of interest IA in the accumulated downscale image AIMG has reached the preset proportion, the weight applying unit 240 may provide the afterimage data ADD including the afterimage detection result to the timing controller 300. For example, in case that the proportion of the region of interest IA in the accumulated downscale image AIMG reaches ¼, the weight applying unit 240 may generate the afterimage data ADD and the afterimage detection process may be ended.

Therefore, the downscaling unit 210 may generate the downscale image SIMG in which the proportion of the region of interest IA is increased based on the downscaling weight. The afterimage detection device 200 may improve the afterimage detection rate by repeating the afterimage detection process using the downscale image SIMG in which the proportion of the region of interest IA is increased. The display device may prevent the occurrence of an afterimage, reduce the color shift, and improve the display quality by generating a data voltage based on the compensation data DATA that has reflected the afterimage data ADD.

Figure 7:
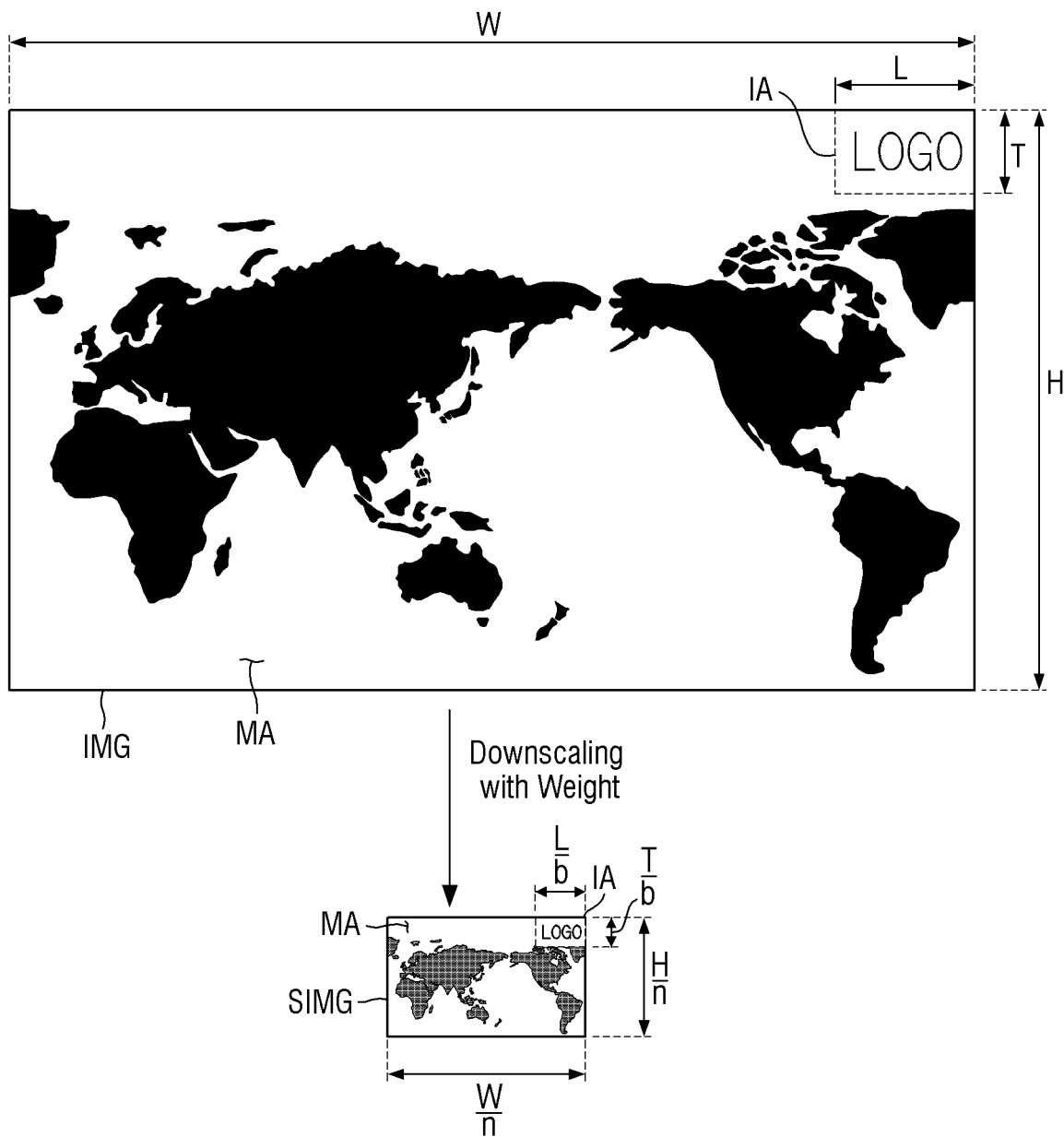
FIGS. 7 and 8 show a downscaling process to which a downscaling weight and a luminance weight of an afterimage detection device according to an embodiment are applied.
Figure 8:
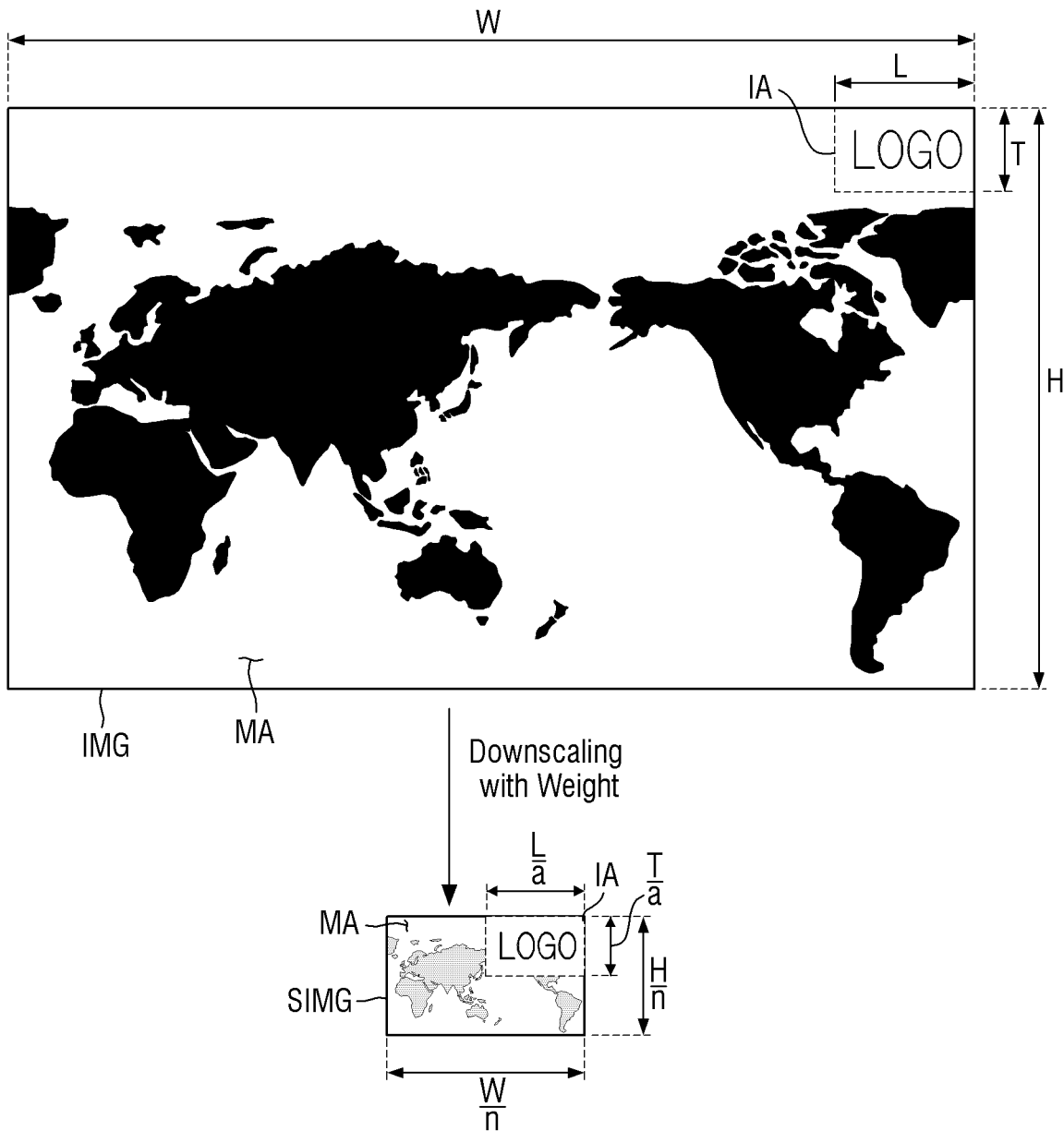

FIGS. 7 and 8 show a downscaling process to which a downscaling weight and a luminance weight of an afterimage detection device according to an embodiment are applied. FIG. 7 corresponds to a case where the downscaling unit receives the downscaling weight and the luminance weight after the downscaling process of FIG. 4. FIG. 8 corresponds to a case where the downscaling unit receives the reset downscaling weight and the reset luminance weight after the downscaling process of FIG. 7.

In FIG. 7, the weight applying unit 240 may receive the afterimage information ADR and calculate the downscaling weight of the region of interest IA based on the time parameter and additionally calculate the luminance weight of the general region MA based on the time parameter. The weight applying unit 240 may provide the weight information WA including the downscaling weight and the luminance weight to the downscaling unit 210.

In case that the downscaling unit 210 receives the downscaling weight and the luminance weight, the downscaling unit 210 may downscale the region of interest IA at the ratio to which the downscaling weight is applied (downscaling with weight), downscale the general region MA at the preset ratio, and reduce the luminance of the general region MA based on the luminance weight. For example, the downscaling unit 210 may downscale the horizontal size L and vertical size T of the region of interest IA by 1/b times, downscale the horizontal size W and vertical size H of the general region MA by 1/n times, and reduce the luminance of the general region MA. The size (L/b×T/b) of the region of interest IA in FIG. 7 that is downscaled at the ratio to which the downscaling weight is applied may be greater than the size (L/n×T/n) of the region of interest IA in FIG. 4 that is downscaled at the preset ratio. The luminance of the general region MA of FIG. 7 to which the luminance weight is applied may be lower than the luminance of the general region MA of FIG. 4 to which the luminance weight is not applied.

Therefore, the downscaling unit 210 may generate the downscale image SIMG in which the proportion of the region of interest IA is increased based on the downscaling weight and the luminance of the general region MA is decreased based on the luminance weight. The afterimage detection device 200 may further improve the afterimage detection rate by downscaling the input image IMG using the downscaling weight and the luminance weight compared to the case of downscaling the input image IMG using the downscaling weight.

Referring to FIG. 8 as well as FIG. 3, the weight applying unit 240 may reset the downscaling weight and the luminance weight based on the time parameter in case that the proportion of the region of interest IA in the accumulated downscale image AIMG has not reached the preset proportion. Here, since the accumulated downscale image AIMG is obtained by accumulating at least one downscale image SIMG, the proportion of the region of interest IA in the accumulated downscale image AIMG and the proportion of the region of interest IA in the scale image SIMG may be the same. Further, in case that the downscaling unit 210, the image accumulation unit 220, the afterimage detection unit 230, and the weight applying unit 240 repeat the afterimage detection process, the time parameter may be continuously increased. The time parameter of the downscaling weight and the luminance weight that are applied in FIG. 8 may be greater than the time parameter of the downscaling weight and the luminance weight that are applied in FIG. 7.

In case that the downscaling unit 210 receives the reset downscaling weight and the reset luminance weight, the downscaling unit 210 may downscale the region of interest IA at the ratio to which the downscaling weight is applied (downscaling with weight), downscale the general region MA at the preset ratio, and reduce the luminance of the general region MA based on the luminance weight. For example, the downscaling unit 210 may downscale the horizontal size L and vertical size T of the region of interest IA by 1/a times and downscale the horizontal size W and vertical size H of the general region MA by 1/n times. The size (L/a×T/a) of the region of interest IA in FIG. 8 that is downscaled at the ratio to which the reset downscaling weight is applied may be greater than the size (L/b×T/b) of the region of interest IA of FIG. 7 that is downscaled at the ratio to which the previous downscaling weight is applied. The size (L/a×T/a) of the region of interest IA in FIG. 8 that is downscaled at the ratio to which the reset downscaling weight is applied may be greater than the size (L/n×T/n) of the region of interest IA of FIG. 4 that is downscaled at the preset ratio. Further, the luminance of the general region MA of FIG. 8 to which the reset luminance weight is applied may be lower than the luminance of the general region MA of FIG. 7 to which the previous luminance weight is applied.

In case that the proportion of the region of interest IA in the accumulated downscale image AIMG has reached the preset proportion, the weight applying unit 240 may provide the afterimage data ADD including the afterimage detection result to the timing controller 300. For example, in case that the proportion of the region of interest IA in the accumulated downscale image AIMG reaches ¼, the weight applying unit 240 may generate the afterimage data ADD and the afterimage detection process may be ended.

Therefore, the downscaling unit 210 may generate the downscale image SIMG in which the proportion of the region of interest IA is increased based on the downscaling weight and the luminance of the general region MA is decreased based on the luminance weight. The afterimage detection device 200 may further improve the afterimage detection rate by repeating the downscaling process of the input image IMG using the downscaling weight and the luminance weight compared to the case of downscaling the input image IMG using the downscaling weight. The display device may prevent the occurrence of an afterimage, reduce the color shift, and improve the display quality by generating a data voltage based on the compensation data DATA that has reflected the afterimage data ADD.

Figure 9:
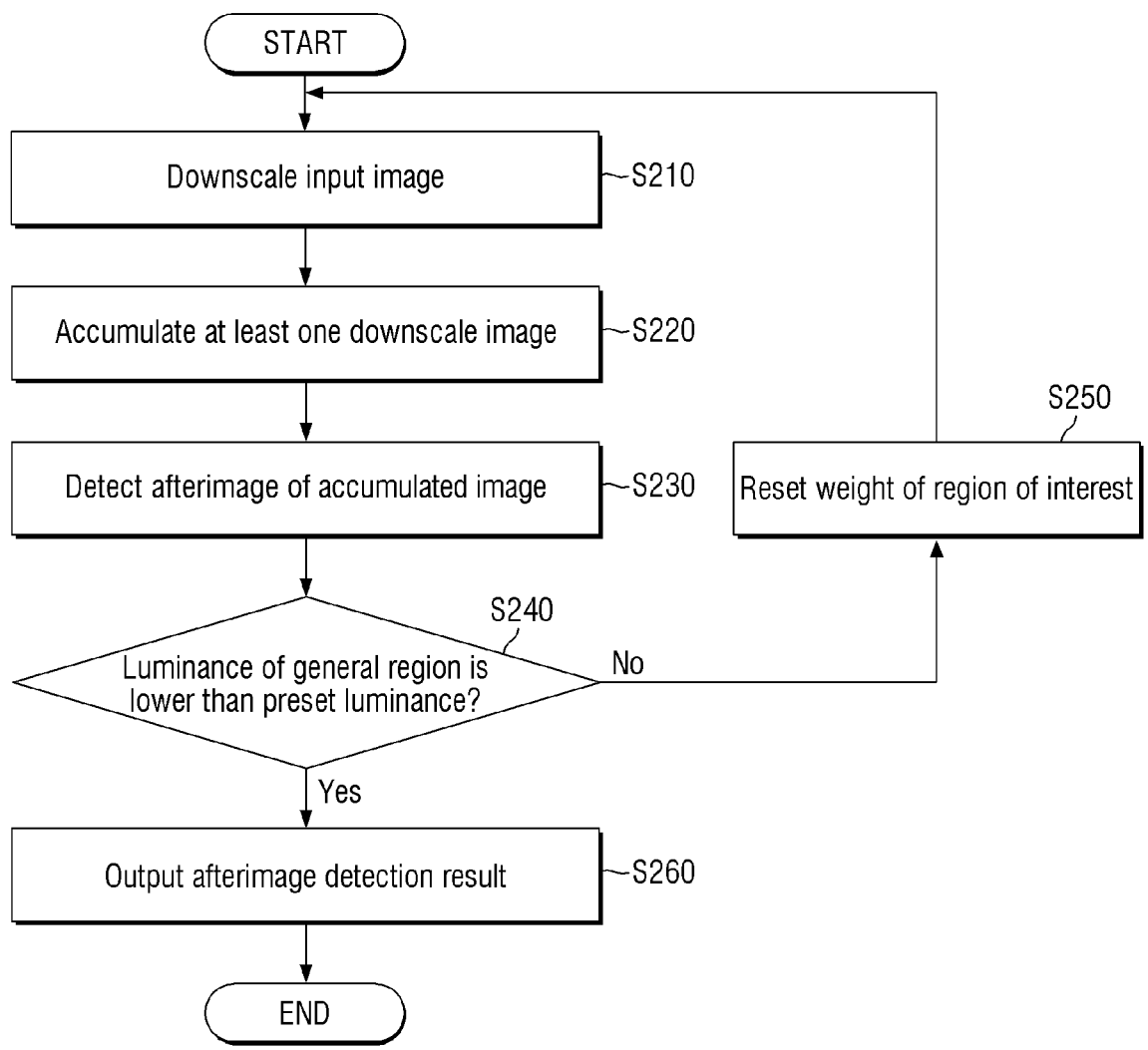
FIG. 9 is a flowchart showing an afterimage detection process of an afterimage detection device according to an embodiment.

FIG. 9 is a flowchart showing an afterimage detection process of an afterimage detection device according to an embodiment.

Referring to FIG. 9, the afterimage detection device 200 may include the downscaling unit 210, the image accumulation unit 220, the afterimage detection unit 230, and the weight applying unit 240.

The downscaling unit 210 may receive the input image IMG on a frame basis and downscale the input image IMG at a preset ratio (step S210). In case that additional weigh information WA is not received, the downscaling unit 210 may downscale the horizontal size and the vertical size of each of the general region and the region of interest of the input image IMG by 1/n times.

The image accumulation unit 220 may receive at least one downscale image SIMG and accumulate at least one downscale image SIMG (step S220).

The afterimage detection unit 230 may detect the afterimage from the accumulated downscale image AIMG obtained by the image accumulation unit 220 and generate afterimage information (step S230).

The weight applying unit 240 may determine the luminance of the general region in the accumulated downscale image AIMG (step S240). Here, the luminance may be, but not necessarily, determined based on the average luminance of all pixels or the maximum luminance of all pixels.

In step S250, the weight applying unit 240 may reset the luminance weight based on a time parameter in case that the luminance of the general region in the accumulated downscale image AIMG is higher than or equal to a preset luminance (i.e. step S240 is 'No'). The weight applying unit 240 may provide the weight information WA including the reset luminance weight to the downscaling unit 210.

In case that the downscaling unit 210 receives the weight information WA, the downscaling unit 210, the image accumulation unit 220, the afterimage detection unit 230, and the weight applying unit 240 may repeat the step S210, the step S220, the step S230, and the step S240. In case that the downscaling unit 210 receives the luminance weight, the downscaling unit 210 may downscale the horizontal size and the vertical size of each of the region of interest and the general region by 1/n times and reduce the luminance of the general region.

In case that the luminance of the general region in the accumulated downscale image AIMG is lower than the preset luminance (i.e., step S240 is 'Yes'), the weight applying unit 240 may provide the afterimage data ADD including the afterimage detection result to the timing controller 300 (step S260).

Figure 10:
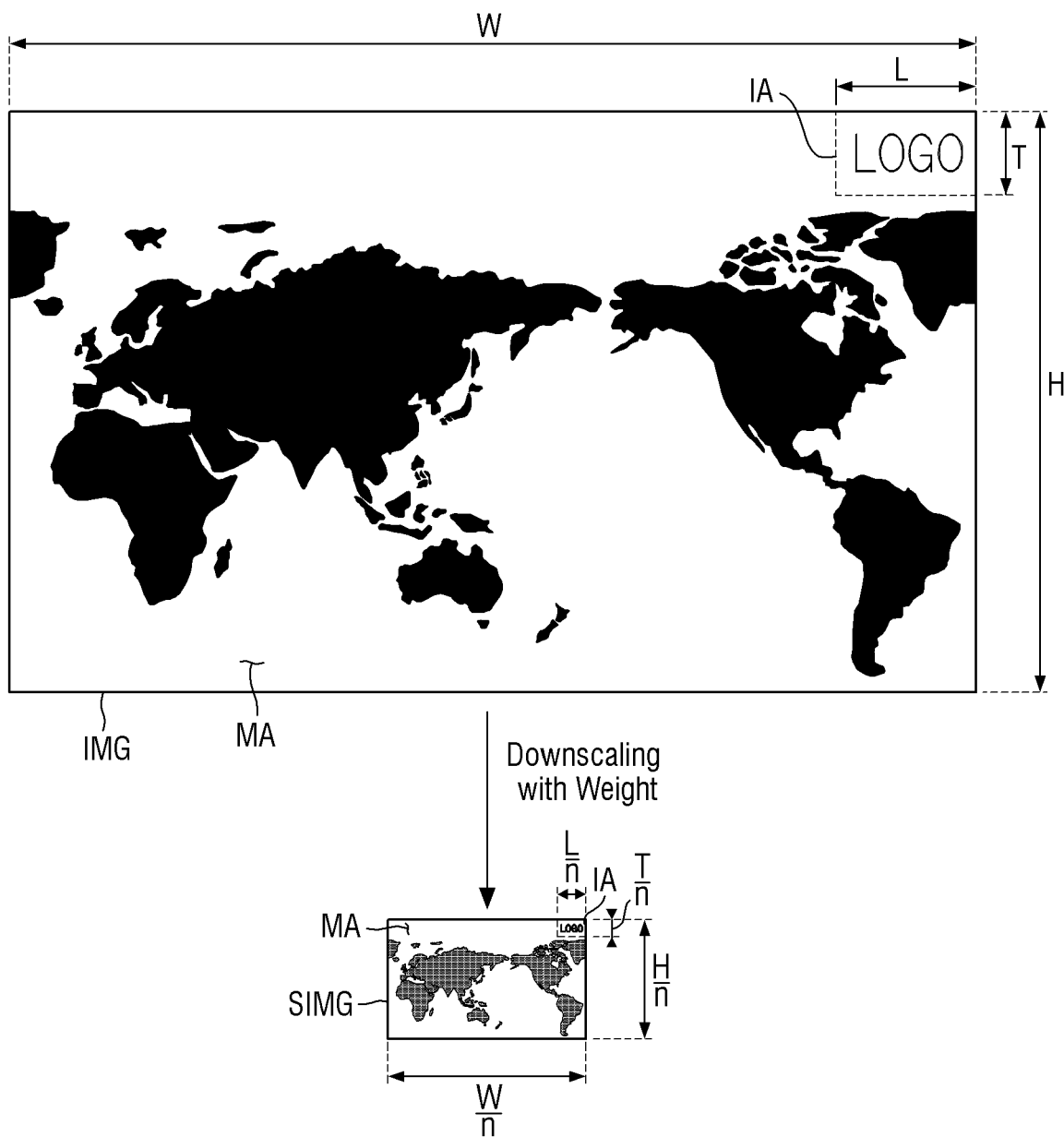
FIGS. 10 and 11 show the downscaling process to which the luminance weight of an afterimage detection device according to an embodiment is applied.
Figure 11:
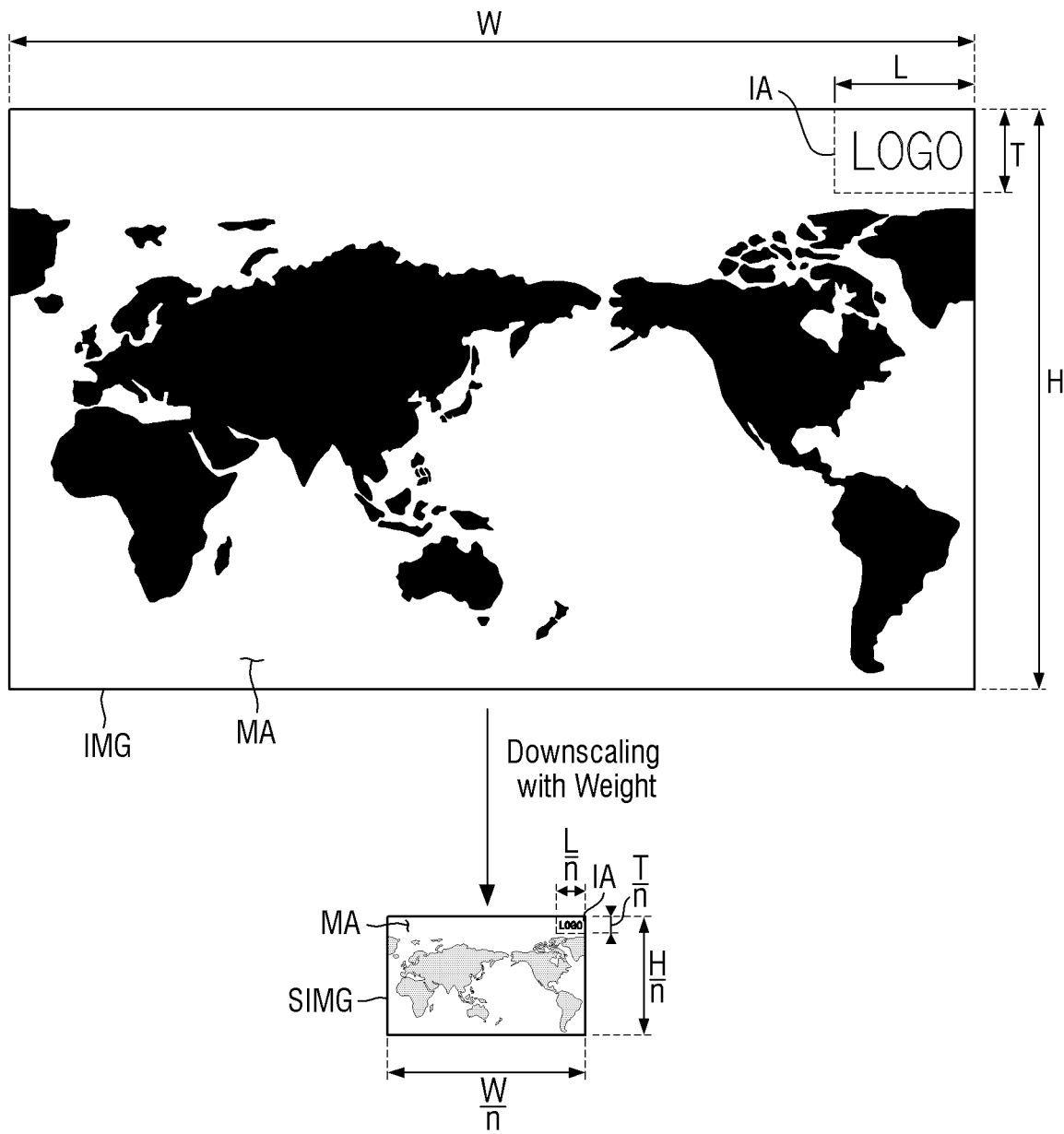

FIGS. 10 and 11 show the downscaling process to which the luminance weight of an afterimage detection device according to an embodiment is applied. FIG. 10 corresponds to a case where the downscaling unit 210 receives the luminance weight after the downscaling process of FIG. 4. FIG. 11 corresponds to a case where the downscaling unit 210 receives the reset luminance weight after the downscaling process of FIG. 10.

In FIG. 10, the weight applying unit 240 may receive the afterimage information ADR and calculate the luminance weight of the general region MA based on the time parameter. The weight applying unit 240 may provide the weight information WA including the luminance weight to the downscaling unit 210.

In case that the downscaling unit 210 receives the luminance weight, the downscaling unit 210 may reduce the luminance of the general region MA based on the luminance weight and downscale the general region MA and the region of interest IA at the preset ratio (downscaling with weight). For example, the downscaling unit 210 may downscale the horizontal size L and vertical size T of the region of interest IA by 1/n times, downscale the horizontal size W and vertical size H of the general region MA by 1/n times, and reduce the luminance of the general region MA. The luminance of the general region MA of FIG. 10 to which the luminance weight is applied may be lower than the luminance of the general region MA of FIG. 4 to which the luminance weight is not applied.

Therefore, the downscaling unit 210 may generate the downscale image SIMG in which the luminance of the general region MA is reduced based on the luminance weight. The afterimage detection device 200 may improve the afterimage detection rate by downscaling the input image IMG using the luminance weight.

Referring to FIG. 11 as well as FIG. 9, in case that the luminance of the general region in the accumulated downscale image AIMG is higher than or equal to the preset luminance, the weight applying unit 240 may reset the luminance weight based on the time parameter. In case that the downscaling unit 210, the image accumulation unit 220, the afterimage detection unit 230, and the weight applying unit 240 repeat the afterimage detection process, the time parameter may be continuously increased. The time parameter of the luminance weight applied in FIG. 11 may be greater than the time parameter of the luminance weight applied in FIG. 10.

In case that the downscaling unit 210 receives the reset luminance weight, the downscaling unit 210 may reduce the luminance of the general region MA based on the luminance weight and downscale the general region MA and the region of interest IA at the preset ratio (downscaling with weight). For example, the downscaling unit 210 may downscale the horizontal size L and vertical size T of the region of interest IA by 1/n times, downscale the horizontal size W and vertical size H of the general region MA by 1/n times, and reduce the luminance of the general region MA. The luminance of the general region MA of FIG. 11 to which the reset luminance weight is applied may be lower than the luminance of the general region MA of FIG. 10 to which the previous luminance weight is applied.

In case that the luminance of the general region MA in the accumulated downscale image AIMG is lower than the preset luminance, the weight applying unit 240 may provide the afterimage data ADD including the afterimage detection result to the timing controller 300.

Therefore, the downscaling unit 210 may generate the downscale image SIMG in which the luminance of the general region MA is reduced based on the luminance weight. The afterimage detection device 200 may improve the afterimage detection rate by repeating the process of downscaling the input image IMG using the luminance weight. The display device may prevent the occurrence of an afterimage, reduce the color shift, and improve the display quality by generating a data voltage based on the compensation data DATA that has reflected the afterimage data ADD.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. An afterimage detection device comprising:
a downscaling circuit that downscales an input image at a preset ratio;
an image accumulation circuit that receives at least one downscale image from the downscaling circuit and accumulates the at least one downscale image;
an afterimage detection circuit that detects an afterimage from an accumulated downscale image obtained by the image accumulation circuit and generates afterimage information; and
a weight applying circuit that receives the afterimage information, calculates a downscaling weight of a region of interest including the afterimage in the input image based on a time parameter, and provides the downscaling weight to the downscaling circuit, the downscaling circuit to downscale the region of interest according to a ratio according to the downscaling weight.

2. The afterimage detection device of claim 1, wherein the time parameter is a span of time during which an image including a fixed image is continuously displayed.

3. The afterimage detection device of claim 1, wherein the downscaling circuit downscales a general region except the region of interest in the input image at the preset ratio to increase a proportion of the region of interest in the accumulated downscale image.

4. The afterimage detection device of claim 3, wherein a size of the region of interest downscaled at the ratio to which the downscaling weight is applied is larger than a size of the region of interest downscaled at the preset ratio.

5. The afterimage detection device of claim 3, wherein a size of the region of interest downscaled at the ratio to which the downscaling weight is applied at a first time parameter is larger than a size of the region of interest downscaled at the ratio to which the downscaling weight is applied at a second time parameter, the first time parameter being greater than the second time parameter.

6. The afterimage detection device of claim 3, wherein the weight applying circuit recalculates the downscaling weight based on the time parameter when a proportion of the region of interest in the accumulated downscale image does not reach a preset proportion.

7. The afterimage detection device of claim 3, wherein the weight applying circuit outputs afterimage data including an afterimage detection result when a proportion of the region of interest in the accumulated downscale image reaches a preset proportion.

8. The afterimage detection device of claim 1, wherein the weight applying circuit additionally calculates a luminance weight of a general region except the region of interest in the input image based on the time parameter, and provides the luminance weight to the downscaling circuit.

9. The afterimage detection device of claim 8, wherein the downscaling circuit downscales the region of interest at a ratio to which the downscaling weight is applied, downscales the general region at a preset ratio, and reduces a luminance of the general region based on the luminance weight.

10. The afterimage detection device of claim 9, wherein a size of the region of interest downscaled at the ratio to which the downscaling weight is applied is larger than a size of the region of interest downscaled at the preset ratio, and a luminance of the general region to which the luminance weight is applied is lower than a luminance of the general region in the input image.

11. The afterimage detection device of claim 9, wherein a luminance of the general region to which the luminance weight is applied at a first time parameter lower than a luminance of the general region to which the luminance weight is applied at a second time parameter, the first time parameter being greater than the second time parameter.

12. The afterimage detection device of claim 9, wherein the weight applying circuit recalculates the downscaling weight and the luminance weight based on the time parameter when a proportion of the region of interest in the accumulated downscale image does not reach a preset proportion.

13. The afterimage detection device of claim 9, wherein the weight applying circuit outputs afterimage data including an afterimage detection result when a proportion of the region of interest in the accumulated downscale image reaches a preset proportion.

14. An afterimage detection device comprising:
a downscaling circuit that downscales an input image at a preset ratio;
an image accumulation circuit that receives at least one downscale image from the downscaling circuit and accumulates the at least one downscale image;
an afterimage detection circuit that detects an afterimage from an accumulated downscale image obtained by the image accumulation circuit and generates afterimage information; and
a weight applying circuit that receives the afterimage information, calculates a luminance weight of a general region which does not include the afterimage in the input image based on a time parameter, and provides the luminance weight to the downscaling circuit, wherein the downscaling circuit to downscale the general region according to a ratio according to the calculated luminance weight.

15. The afterimage detection device of claim 14, wherein the time parameter is a span of time during which an image including a fixed image is continuously displayed.

16. The afterimage detection device of claim 14, wherein the downscaling circuit reduces a luminance of the general region based on the luminance weight.

17. The afterimage detection device of claim 16, wherein a luminance of the general region to which the luminance weight is applied at a first time parameter is lower than a luminance of the general region to which the luminance weight is applied at a second time parameter, the first time parameter being greater than the second time parameter.

18. The afterimage detection device of claim 16, wherein the weight applying circuit recalculates the luminance weight based on the time parameter when a luminance of the general region in the accumulated downscale image is equal to or greater than a preset luminance.

19. The afterimage detection device of claim 16, wherein the weight applying circuit outputs afterimage data including an afterimage detection result when a luminance of the general region in the accumulated downscale image is lower than a preset luminance.

20. A display device comprising:
an afterimage detection device that detects an afterimage of an input image and outputs afterimage data;
a timing controller circuit that generates compensation data based on the afterimage data; and
a display panel that displays an image based on the compensation data,
wherein the afterimage detection device comprises:
a downscaling circuit that downscales an input image at a preset ratio;
an image accumulation circuit that receives at least one downscale image from the downscaling circuit and accumulates the at least one downscale image;
an afterimage detection circuit that detects an afterimage from an accumulated downscale image obtained by the image accumulation circuit and generates afterimage information; and
a weight applying circuit that receives the afterimage information, calculates a downscaling weight of a region of interest including the afterimage in the input image based on a time parameter, and provides the downscaling weight to the downscaling circuit, the downscaling circuit to downscale the region of interest according to a ratio according to the calculated downscaling weight and to downscale a general region external to the region of interest according to the preset ratio, the ratio according to the calculated downscaling weight being different from the preset ratio.

21. The afterimage detection device of claim 1, wherein the downscaling weight is used to increase a proportion of the region of interest in the accumulated downscale image.

22. The afterimage detection device of claim 1, wherein the weight applying circuit further calculates a luminance weight of a general region external to the region of interest based on the time parameter and provides the luminance weight to the downscaling circuit.

\* \* \* \* \*